US012638614B2

(12) United States Patent
Hutfluss et al.

(10) Patent No.: US 12,638,614 B2
(45) Date of Patent: May 26, 2026

(54) METHOD FOR MAKING SILICONE HYDROGEL CONTACT LENSES

(71) Applicant: Alcon Inc., Fribourg (CH)

(72) Inventors: Lisa Nicole Hutfluss, Doraville, GA (US); Jing Cheng, Anaheim, CA (US); Feng Jing, Snellville, GA (US); Steve Yun Zhang, Sugar Hill, GA (US); Michelle Plavnik, Atlanta, GA (US)

(73) Assignee: Alcon Inc., Fribourg (CH)

( * ) Notice: Subject to any disclaimer, the term of this patent is extended or adjusted under 35 U.S.C. 154(b) by 396 days.

(21) Appl. No.: 18/308,189

(22) Filed: Apr. 27, 2023

(65) Prior Publication Data

US 2023/0350100 A1 Nov. 2, 2023

Related U.S. Application Data

(60) Provisional application No. 63/336,394, filed on Apr. 29, 2022.

(51) Int. Cl.

*G02B 1/04* (2006.01)
*B29D 11/00* (2006.01)
*B29K 83/00* (2006.01)

(52) U.S. Cl.

CPC ........ *G02B 1/043* (2013.01); *B29D 11/00134* (2013.01); *B29D 11/00192* (2013.01); *B29K 2083/00* (2013.01)

(58) Field of Classification Search

None

See application file for complete search history.

(56) References Cited

U.S. PATENT DOCUMENTS

| | | | |
|---|---|---|---|
| 4,136,250 | A | 1/1979 | Mueller et al. |
| 4,153,641 | A | 5/1979 | Deichert et al. |
| 4,182,822 | A | 1/1980 | Chang |
| 4,189,546 | A | 2/1980 | Deichert et al. |

(Continued)

FOREIGN PATENT DOCUMENTS

| | | | |
|---|---|---|---|
| KR | 20190097948 | A | 8/2019 |

*Primary Examiner* — Peter A Salamon

(74) *Attorney, Agent, or Firm* — Jian Zhou

(57) ABSTRACT

The invention provides a method for making silicone hydrogel contact lenses in a relatively efficient and consistent manner from a lens formulation (i.e., a polymerizable composition) including a thermal initiator having a 10-hour half-life temperature ($T_{10h\lambda}$) under a controlled thermal curing scheme. A method of the invention comprises a step of curing the lens formulation in an oven according to a thermal curing profile that comprises or consists essentially of increasing the oven's temperature from room temperature or a temperature that is at least about 5° C. lower than $T_{10h\lambda}$ to a temperature that is at least 30° C. higher than $T_{10h\lambda}$ at a selected rate (e.g., from about 1° C./minute to about 10° C./minute). Under such a controlled thermal curing scheme, the lens diameter of the fully-hydrated silicone hydrogel contact lenses obtained according to a method of the invention does not vary significantly with the positions of the molds in the oven.

15 Claims, 1 Drawing Sheet

(56) References Cited

U.S. PATENT DOCUMENTS

| | | | |
|---|---|---|---|
| 4,254,248 | A | 3/1981 | Friends et al. |
| 4,259,467 | A | 3/1981 | Keogh et al. |
| 4,260,725 | A | 4/1981 | Keogh et al. |
| 4,261,875 | A | 4/1981 | LeBoeuf |
| 4,276,402 | A | 6/1981 | Chromecek |
| 4,312,575 | A | 1/1982 | Peyman et al. |
| 4,327,203 | A | 4/1982 | Deichert et al. |
| 4,341,889 | A | 7/1982 | Deichert et al. |
| 4,343,927 | A | 8/1982 | Chang |
| 4,355,147 | A | 10/1982 | Deichert et al. |
| 4,444,711 | A | 4/1984 | Schad |
| 4,460,534 | A | 7/1984 | Boehm et al. |
| 4,486,577 | A | 12/1984 | Mueller et al. |
| 4,543,398 | A | 9/1985 | Bany et al. |
| 4,605,712 | A | 8/1986 | Mueller et al. |
| 4,632,844 | A | 12/1986 | Yanagihara et al. |
| 4,661,575 | A | 4/1987 | Tom |
| 4,684,538 | A | 8/1987 | Klemarczyk |
| 4,703,097 | A | 10/1987 | Wingler et al. |
| 4,833,218 | A | 5/1989 | Lee |
| 4,837,289 | A | 6/1989 | Mueller et al. |
| 4,954,586 | A | 9/1990 | Toyoshim et al. |
| 4,954,587 | A | 9/1990 | Mueller |
| 5,010,141 | A | 4/1991 | Mueller |
| 5,034,461 | A | 7/1991 | Lai et al. |
| 5,039,761 | A | 8/1991 | Ono et al. |
| 5,070,170 | A | 12/1991 | Robertson et al. |
| 5,070,215 | A | 12/1991 | Bambury et al. |
| 5,079,319 | A | 1/1992 | Mueller |
| 5,346,946 | A | 9/1994 | Yokoyama et al. |
| 5,358,995 | A | 10/1994 | Lai et al. |
| 5,387,632 | A | 2/1995 | Lai et al. |
| 5,416,132 | A | 5/1995 | Yokoyama et al. |
| 5,449,729 | A | 9/1995 | Lai |
| 5,451,617 | A | 9/1995 | Lai et al. |
| 5,486,579 | A | 1/1996 | Lai et al. |
| 5,760,100 | A | 6/1998 | Nicolson et al. |
| 5,843,446 | A | 12/1998 | Ladd et al. |
| 5,894,002 | A | 4/1999 | Boneberger et al. |
| 5,962,548 | A | 10/1999 | Vanderlaan et al. |
| 5,981,675 | A | 11/1999 | Valint, Jr. et al. |
| 6,039,913 | A | 3/2000 | Hirt et al. |
| 6,166,236 | A | 12/2000 | Bambury et al. |
| 6,367,929 | B1 | 4/2002 | Maiden et al. |
| 6,451,871 | B1 | 9/2002 | Winterton et al. |
| 6,719,929 | B2 | 4/2004 | Winterton et al. |
| 6,762,264 | B2 | 7/2004 | Kunzler et al. |
| 6,793,973 | B2 | 9/2004 | Winterton et al. |
| 6,811,805 | B2 | 11/2004 | Gilliard et al. |
| 6,822,016 | B2 | 11/2004 | McCabe et al. |
| 6,867,245 | B2 | 3/2005 | Iwata et al. |
| 6,896,926 | B2 | 5/2005 | Qiu et al. |
| 7,214,809 | B2 | 5/2007 | Zanini et al. |
| 7,423,074 | B2 | 9/2008 | Lai et al. |
| 7,858,000 | B2 | 12/2010 | Winterton |
| 8,147,897 | B2 | 4/2012 | Ferreiro et al. |
| 8,163,206 | B2 | 4/2012 | Chang |
| 8,409,599 | B2 | 4/2013 | Wu et al. |
| 8,415,405 | B2 | 4/2013 | Maggio et al. |
| 8,475,529 | B2 | 7/2013 | Clarke |
| 8,480,227 | B2 | 7/2013 | Qiu et al. |
| 8,529,057 | B2 | 9/2013 | Qiu et al. |
| 8,557,334 | B2 | 10/2013 | Samuel et al. |
| 8,614,261 | B2 | 12/2013 | Iwata et al. |
| 8,658,748 | B2 | 2/2014 | Liu |
| 8,835,525 | B2 | 9/2014 | Kuyu et al. |
| 8,993,651 | B2 | 3/2015 | Chang et al. |
| 9,097,840 | B2 | 8/2015 | Chang |
| 9,103,965 | B2 | 8/2015 | Chang |
| 9,187,601 | B2 | 11/2015 | Huang |
| 9,217,813 | B2 | 12/2015 | Liu et al. |
| 9,315,669 | B2 | 4/2016 | Holland et al. |
| 9,475,827 | B2 | 10/2016 | Chang |
| 9,505,184 | B2 | 11/2016 | Kolluru |
| 10,081,697 | B2 | 9/2018 | Huang |
| 10,301,451 | B2 | 5/2019 | Jing |
| 10,465,047 | B2 | 11/2019 | Jing |
| 2014/0198295 | A1 | 7/2014 | Fujisawa et al. |
| 2019/0366658 | A1* | 12/2019 | Lang ...................... G02B 1/043 |
| 2019/0366660 | A1* | 12/2019 | Ge ......................... G02B 1/043 |
| 2022/0126541 | A1 | 4/2022 | Ge et al. |

* cited by examiner

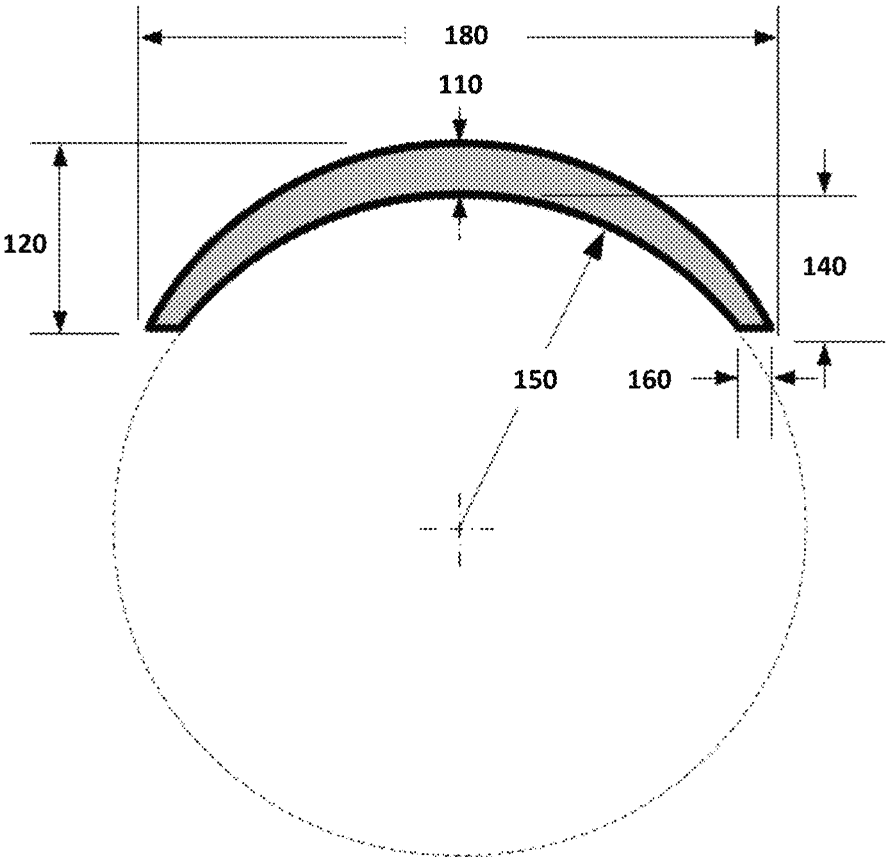
180
110
120
140
150
160

METHOD FOR MAKING SILICONE HYDROGEL CONTACT LENSES

This application claims the benefit under 35 USC § 119 (e) of U.S. provisional application No. 63/336,394 filed 29 Apr. 2022, herein incorporated by reference in its entirety.

The present invention is related to a method for producing silicone hydrogel (SiHy) contact lenses in a consistent manner.

BACKGROUND

In recent years, silicone hydrogel contact lenses become more and more popular because of their high oxygen permeability and comfort. Most commercially-available silicone hydrogel contact lenses are produced economically in large number in a manufacturing method which generally includes a molding process according to a conventional cast-molding technique involving polymerization (curing) of a polymerizable composition (i.e., a lens formulation) in disposable plastic molds. In the cast-molding method involving thermal curing, a polymerizable composition (or lens formulation) in molds is polymerized thermally in an oven according to a thermal curing profile typically consisting of steps of ramping the oven's temperature to and then holding the oven's temperature at each of two or more curing temperatures, to obtain molded polymer articles which are in turn subjected to various post-molding processes including extraction, hydration, packaging, and sterilization, etc. to form the final hydrated silicone hydrogel contact lens. The molded polymer article has a shape and size similar to the shape of size of the final hydrated soft contact lenses, except that allowance must be made for swelling of the soft contact lens during hydration of the molded polymer article. To achieve the prescribed optical correction, silicone hydrogel contact lenses must be designed and then produced to meet demanding dimensional requirements. However, the dimensions and properties can be varied by changes in polymerization rate or conditions as caused by the positions of molds in the oven.

Accordingly, there is still a need for a lens manufacturing process according to which silicone hydrogel contact lenses can be produced according to a thermal cast-molding technique to have a consistent, targeted lens dimension.

SUMMARY OF THE INVENTION

In accomplishing the foregoing, the present invention provides a method for producing hydrated soft contact lenses. The method comprises the steps of: (1) obtaining a polymerizable composition which is clear at room temperature, wherein the polymerizable composition comprises (a) at least one siloxane-containing (meth)acrylamido monomer, (b) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonylamino groups, vinyloxy-carbonyloxy groups, or combinations thereof, (c) from about 15% to about 55% by weight of at least one hydrophilic (meth)acrylamido monomer having 3 to 8 carbon atoms, (d) from about 4% to about 20% by weight of an organic solvent having 3 to 8 carbon atoms relative to the total weight of the polymerizable composition, (e) at least one thermal free radical initiator having a 10-hour half-life temperature (designated as "$T_{10h\lambda}$") of from about 50° C. to about 90° C., wherein the sum of the amounts of components (a) to (c) is at least 90% by weight relative to total amount of all polymerizable components in the polymerizable composition; (2) introducing the polymerizable composition into lens molds, wherein each lens mold comprises a male mold half having a first molding surface and a female mold half having a second molding surface, wherein the male and female mold halves are configured to receive each other such that a mold cavity is formed between the first and second molding surfaces when each lens mold is closed; (3) curing thermally the polymerizable composition in the lens mold in an oven according to a curing profile to form silicone hydrogel lens precursors, wherein the curing profile comprises increasing the oven's temperature from a first temperature, $T_1$, to a second temperature, $T_2$, at a ramping rate, $r_T$, and then lowering the oven's temperature from $T_2$ to $T_1$ or lower, wherein $$T_1 \le (T_{10h\lambda} - 5)° \text{ C.}, T_2 \ge (T_{10h\lambda} + 30)° \text{ C.}, r_T = \frac{(T_2 - T_1)}{t}$$

in which t is a total curing time of from about 30 minutes to about 200 minutes; (4) separating each lens molds into male and female mold halves, with one silicone hydrogel lens precursor being adhered on one lens-adhered mold half which is one of the male and female mold halves of each lens mold; (5) removing silicone hydrogel lens precursors from lens-adhered mold halves; and (6) subjecting the silicone hydrogel lens precursors to one or more post-molding processes selected from the group consisting of extraction, surface treatment, hydration, packaging, sterilization, and combinations thereof, to form silicone hydrogel contact lenses.

The invention provides in another aspect silicone hydrogel contact lenses obtained according to a method of the invention.

BRIEF DESCRIPTION OF DRAWINGS

FIG. 1 illustrates the general dimensions of a contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" or "SiHy contact lens" refers to a contact lens comprising a silicone hydrogel bulk (core) material.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "room temperature" refers to a temperature of about 21° C. to about 27° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.01% by weight at room temperature.

The term "ethylenically unsaturated group" is employed herein in a broad sense and is intended to encompass any groups containing at least one >C=C< group. Exemplary ethylenically unsaturated groups include without limitation (meth)acryloyl

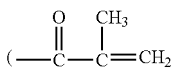

and/or

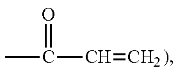

vinyloxycarbonylamino

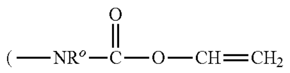

in which $R^o$ is H or $C_1$-$C_4$ alkyl), vinyloxycarbonyloxy

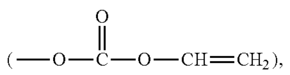

allyl, vinyl, styrenyl, or other C=C containing groups.

The term "terminal ethylenically unsaturated group" refers to one ethyleneically unsaturated group at one of the two ends of the main chain (or backbone) of an organic compound as known to a person skilled in the art.

An "acrylic monomer" refers to a vinylic monomer having one sole (meth)acryloyl group. Examples of acrylic monomrs includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

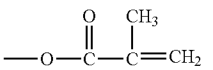

or

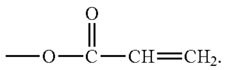

An "(meth)acrylamido monomer" refers to a vinylic monomer having one sole group of

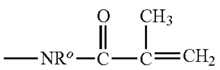

or

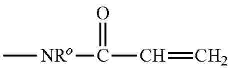

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group $$(-CH=CH_2)$$

that is directly attached to the nitrogen atom of the amide group.

The term "ene group" refers to a monovalent radical of $CH_2=CH-$ or $CH_2=CCH_3-$ that is not covalently attached to an oxygen or nitrogen atom or a carbonyl group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "blending vinylic monomer" refers to a vinylic monomer capable of dissolving both hydrophilic and hydrophobic components of a polymerizable composition to form a solution.

A siloxane, which often also described as a silicone, refers to a molecule having at least one moiety of —Si—O—Si— where each Si atom carries two organic groups as substituents.

A "silicone-containing vinylic monomer or crosslinker" or a "siloxane-containing vinylic monomer or crosslinker" interchageably refers to a vinylic monomer or crosslinker having at least one moiety of —Si—O—Si— where each Si atom carries at least two substituents (organic groups).

A "polysiloxane segment" or "polydiorganosiloxane segment" interchangeably refers to a polymer chain segment (i.e., a divalent radical) of

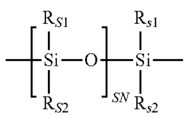

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}RN_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polydiorganosiloxane vinylic monomer" or "polysiloxane vinylic monomer" interchangeably refers to a compound comprising at least one polysiloxane segment and one sole ethylenically-unsaturated groups.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

A "macromer" or "prepolymer" refers to a compound or polymer that has ethylenically unsaturated groups and has a number average molecular weight of greater than 700 Daltons.

As used in this application, the term "polymer" means a material formed by polymerizing or crosslinking one or more monomers or macromers or prepolymers or combinations thereof.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

A "thermal free radical initiator" refers to a chemical that initiates radical crosslinking/polymerizing reaction by the use of heat energy.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

"Post-curing surface treatment", in reference to a SiHy lens bulk material or a SiHy contact lens, means a surface treatment process that is performed after the SiHy lens bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a SiHy contact lens or a SiHy lens bulk material as well known to a person skilled in the art.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "HEVL-absorbing vinylic monomer" refers to a compound comprising an ethylenically-unsaturated group and a HEVL-absorbing moiety which can absorb or screen out HEVL (high-energy-violet-light) radiation in the range from 380 nm to 440 nm as understood by a person skilled in the art.

As used in this application, the term "phosphorylcholine" refers to a zwitterionic group of

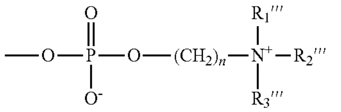

in which n is an integer of 1 to 5 and $R_1'''$, $R_2'''$ and $R_3'''$ independently of each other are $C_1$-$C_8$ alkyl or $C_1$-$C_8$ hydroxyalkyl.

A "10-hour half-life temperature" in reference to a thermal free radical initiator means a temperature at which 10 hours is required to reduce the original initiator content of a solution by 50%. In accordance with the invention, the 10-hour half-life temperature of a thermal free radical initiator is the value published by the manufacturer. It is understood that it can also be determined experimentally as known to a person skilled in the art.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as $[(cm^3 \text{ oxygen})(cm)/(cm^2)(sec)(mm\ Hg)]\times10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)]\times10^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a SiHy material or a contact lens means that the SiHy material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

In general, the invention is directed to a method for producing silicone hydrogel (SiHy) contact lenses in a relatively efficient and consistent manner from a lens formulation (i.e., a polymerizable composition) of the invention under a controlled thermal curing scheme. The invention is partly based on the discovery that when a thermal curing profile consists essentially of increasing the oven's temperature from a first temperature (e.g., room temperature or a temperature that is at least about 5° C. lower than the 10-hour half-life temperature of the thermal initiator in a polymerizable composition) to a second temperature that is at least 30° C. higher than the 10-hour half-life temperature of the thermal initiator at a selected rate (e.g., from about 1° C./minute to about 10° C./minute), the lens diameter of the fully-hydrated silicone hydrogel contact lenses obtained from the curing of the polymerizable composition in molds in an oven does not vary significantly with the positions of the molds in the oven. The advantages of the invention are to efficiently produce silicone hydrogel contact lenses with consistent lens dimensions diameter.

The present invention provides a method for producing silicone hydrogel contact lenses. The method comprises the steps of: (1) obtaining a polymerizable composition which is clear at room temperature, wherein the polymerizable composition comprises (a) at least one siloxane-containing (meth)acrylamido monomer, (b) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonylamino groups, vinyloxy-carbonyloxy groups, or combinations thereof, (c) from about 15% to about 55% by weight of at least one hydrophilic (meth)acrylamido monomer having 3 to 8 carbon atoms, (d) from about 4% to about 20% by weight (preferably 4% to about 16%, more preferably from about 4% to about 12%, even more preferably from about 4% to about 10% by weight) of an organic solvent having 3 to 8 carbon atoms relative to the total weight of the polymerizable composition, (e) at least one thermal free radical initiator having a 10-hour half-life temperature (designated as "$T_{10h\lambda}$") of from about 50° C. to about 90° C., wherein the sum of the amounts of components (a) to (c) is at least 90% by weight (preferably at least 92% by weight, more preferably at least 94% by weight) relative to total amount of all polymerizable components in the polymerizable composition; (2) introducing the polymerizable composition into lens molds, wherein each lens mold comprises a male mold half having a first molding surface and a female mold half having a second molding surface, wherein the male and female mold halves are configured to receive each other such that a mold cavity is formed between the first and second molding surfaces when each lens mold is closed; (3) curing thermally the polymerizable composition in the lens molds in an oven according to a curing profile to form silicone hydrogel lens precursors, wherein the curing profile comprises increasing the oven's temperature from a first temperature, $T_1$, to a second temperature, $T_2$, at a ramping rate, $r_T$, and then lowring the oven's temperature from $T_2$ to $T_1$ or lower, wherein $$T_1 \leq (T_{10h\lambda} - 5)^\circ \text{ C.}, T_2 \geq (T_{10h\lambda} + 30)^\circ \text{ C.}, r_T = \frac{(T_2 - T_1)}{t}$$

in which t is a total curing time of from about 30 minutes to about 200 minutes; (4) separating each lens molds into male and female mold halves, with one silicone hydrogel lens precursor being adhered on one lens-adhered mold half which is one of the male and female mold halves of each lens mold; (5) removing silicone hydrogel lens precursors from lens-adhered mold halves; and (6) subjecting the silicone hydrogel lens precursors to one or more post-molding processes selected from the group consisting of extraction, surface treatment, hydration, packaging, sterilization, and combinations thereof, to form silicone hydrogel contact lenses. The lens diameters of the silicone hydrogel contact lenses obtained according to the method of the invention do not vary significantly with the positions of the lens molds in the oven, namely, difference in lens diameter among the silicone hydrogel contact lenses obtained from the lens molds located in bottom, middle and top positions in the oven is about 0.05 mm or smaller, preferably about 0.04 mm or smaller, more preferably about 0.03 mm or smaller, even more preferably about 0.02 mm or smaller.

The term "silicone hydrogel lens precursor" refers to a molded silicone hydrogel contact lens which has not been subjected to any post-molding process.

The term "organic solvent" refers to an organic compound that cannot participate in free-radical polymerization reaction.

In accordance with a preferred embodiment of the invention, the organic solvent is a $C_3$-$C_8$ alkyl alcohol.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,446; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

In accordance with the invention, any hydrophilic (meth) acrylamido monomers can be in this invention. Examples of preferred hydrophilic (meth)acrylamido monomers are described later in this application. It is understood that any hydrophilic (meth)acrylamido monomers other than those specifically described later in this application can also be used in this invention.

Any siloxane-containing (meth)acrylamido monomers can be used in the invention. Preferably, siloxane-containing (meth)acrylamido monomers are those (meth)acrylamido monomers each of which comprises a bis(trialkylsilyloxy) alkylsilyl group, a tris(trialkylsilyloxy)-silyl group, or a polysiloxane chain having 3 to 30 siloxane units and terminated with an alkyl, hydroxyalkyl or methoxyalkyl group, as described later in this application. Such preferred siloxane-containing (meth)acrylamido monomers can be obtained from the commercial suppliers, or alternatively prepared according to known procedures, e.g., similar to those described in U.S. Pat. No. 9,315,669.

In accordance with the invention, any polysiloxane vinylic crosslinkers can be used in this invention so long as all the ethylenically unsaturated groups of the polysiloxane vinylic crosslinker are (meth)acrylamido groups, (meth) acryloxy groups, vinyloxycarbonyloxy groups, vinyloxycarbonylamino groups, or combinations thereof. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyloxycarbonyloxy-terminated polydimethylsiloxanes of various molecular weight; α,ω-vinyloxycarbonylamino-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyl-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. Pat. No. 10,081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydisiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

In a preferred embodiment, the thermal free radical initiator is an azo-containing radical initiator, preferably in an amount of from about 0.05% to about 2.0% (preferably from about 0.1% to about 1.75%, more preferably from about 0.15% to about 1.5%, even more preferably from about 0.2% to about 1.25%) by weight relative to the total weight of the polymerizable composition. An azo-containing radical initiator is a free radical initiator containing an azo moiety (*—N═N—*).

In a preferred embodiment, a polymerizable composition further comprises at least one UV-absorbing vinylic monomer and optionally (but preferably) one or more UV/HEVL-absorbing vinylic monomers.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl) benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 2.5%, preferably about 0.2% to about 20%, more preferably about 0.3% to about 1.5%, by weight of one or more UV-absorbing vinylic monomers, related to the amount of all polymerizable components in the polymerizable composition.

It is understood that the amount of at least one UV-absorbing vinylic monomer in the polymerizable composition is sufficient to render a contact lens, which is obtained from the curing of the polymerizable composition, an ability of blocking or absorbing (i.e., the inverse of transmittance) at least 90% (preferably at least about 95%, more preferably at least about 97.5%, even more preferably at least about 99%) of UVB (between 280 and 315 nanometers), at least 70% (preferably at least about 80%, more preferably at least about 90%, even more preferably at least about 95%) of UVA transmittance (between 315 and 380 nanometers), and optionally (but preferably) at least 30% (preferably at least about 40%, more preferably at least about 50%, even more preferably at least about 60%) of violet light between 380 nm and 440 nm, which impinge on the lens.

Any organic solvents known to a person skilled in the art can be used in the invention so long as the organic solvent can dissolve all polymerizable components to form a clear polymerizable composition. Examples of preferred organic solvents having 3 to 8 carbon atoms include without limitation, alcohols having 3 to 8 carbon atoms (e.g., 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 2-hexanol, 3-hexanol, 2-heptanol, 2-octanol, 2-nonanol, 2-decanol, 3-octanol, 2-methyl-2-pentanol, 2,3-dimethyl-2-butanol, 3-methyl-3-pentanol, 2-methyl-2-hexanol, 3-methyl-3-hexanol, 3-methyl-3-heptanol, 4-methyl-4-heptanol, 2-methyl-2-heptanol, 3-ethyl-3-hexanol, 3-methyl-3-heptanol, 2,4-dimethyl-2-pentanol, 3-ethyl-3-pentanol, 1-methoxy-2-propanol, 3-ethoxy-1-propanol, 1-ethoxy-2-propanol, 1-isobutoxy-2-propanol, 3-methoxy-1-butanol, 1-methoxy-2-butanol, norborneol, 1-methylcyclohexanol, 1-methylcyclopentanol, 1-ethylcyclopentanol, 1-ethylcyclopentanol, 4-hydroxy-4-methyl-1-cyclopentanol, or combinations thereof), dipropylene glycol methyl ether, ethylene glycol n-butyl ether, acetone, methyl ethyl ketone, diethylene glycol n-butyl ether, diethylene glycol methyl ether, propylene glycol methyl ether, propylene glycol methyl ether acetate, propylene glycol n-propyl ether, propylene glycol n-butyl ether, ethyl acetate, butyl acetate, amyl acetate, methyl lactate, ethyl lactate, propyl lactate, 1-methyl-2-pyrrolidone, N,N-dimethylpropionamide, dimethyl formamide, dimethyl acetamide, dimethyl propionamide, N-methyl pyrrolidinone, and mixtures thereof. Preferably, the organic solvent is an alcohol having 3 to 5 carbon atoms (e.g., 1-propanol, isopropanol, 1-butanol, sec-butanol, isobutanol, tert-butyl alcohol, 1-pentanol, 2-pentanol, 3-pentanol, 3-methyl-2-butanol, 2-methyl-1-butanol, 2,2-dimethyl-1-propanol, tert-amyl alcohol, 1-methoxy-2-propanol, 3-ethoxy-1-propanol, 1-ethoxy-2-propanol, or combinations thereof).

In a preferred embodiment, the organic solvent has a boiling point that is higher than ($T_{10h\lambda}$+10° C. but lower than the second temperature 120° C. Examples of preferred organic solvents include without limitation, alcohols having 3 to 5 carbon atoms (e.g., 1-propanol, isopropanol, sec-butanol, tert-butyl alcohol, tert-amyl alcohol, acetone, methyl ethyl ketone, ethyl acetate, and mixtures thereof. Preferably, the organic solvent is an alcohol having 3 to 5 carbon atoms (e.g., 1-propanol, isopropanol, sec-butanol, tert-butyl alcohol, tert-amyl alcohol, or combinations thereof). With such a boiling point, the organic solvent could be evaporated to some extent at the second temperature.

In accordance with the present invention, the polymerizable composition can also comprise additional polymerizable components selected from the group consisting of one or more secondary hydrophilic vinylic monomers (i.e., hydrophilic vinylic monomers other than hydrophilic (meth) acrylamido monomer), one or more secondary siloxane-containing vinylic monomers (i.e., siloxane-containing vinylic monomers other than siloxane-containing acrylamido monomer), one or more hydrophobic vinylic monomers free of any silicone, one or more non-silicone vinylic crossliners, and combinations thereof. It is understood that if the other polymerizable components are present in the polymerizable composition, their total amount is about 10% or less by weight (preferably about 7% or less by weight, more preferably about 4% or less by weight, even more preferably about 2% or less by weight) relative the total amount of all polymerizable component in the polymerizable composition.

Any hydrophilic vinylic monomers other than hydrophilic (meth)acrylamido monomer can be used as secondary hydrophilic vinylic monomers in the invention. Examples of such secondary hydrophilic vinylic monomers are hydroxyl-containing (meth)acryloxy monomers (as described below), amino-containing (meth)acryloxy monomers (as described later in this application), carboxyl-containing (meth)acryloxy monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), (meth)acryloxy monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof. Among the preferred hydrophilic vinylic monomers are 2-hydroxyethyl (meth)acrylate aminopropyl (meth)acrylate hydrochloride, dimethylaminoethyl (meth)acrylate, glycerol methacrylate (GMA), ethylene glycol methyl ether (meth)acrylate, N-vinyl-2-pyrrolidone (NVP), allyl alcohol, (meth)acrylic acid, a $C_1$-$C_4$-alkoxy polyethylene glycol (meth)acrylate having a weight average molecular weight of from 200 to 1500, N-vinyl acetamide, N-vinyl-N-methyl acetamide, allyl alcohol, and combinations thereof.

Any siloxane-containing vinylic monomer (other than siloxane-containing (meth)acrylamido monomers) known to a person skilled in the art can be used as secondary siloxane-containing vinylic monomer in the invention. Examples of such siloxane-containing vinylic monomers include without limitation siloxane-containing (meth)acryloxy monomers each having a bis(trialkylsilyloxy)alkylsilyl group or a tris (trialkylsilyloxy)silyl group, mono-(meth)acryloxy-terminated mono-alkyl-terminated polysiloxanes, 3-methacryloxy propylpentamethyldisiloxane, t-butyldimethylsiloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred siloxane-containing (meth)acryloxy monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

A polymerizable composition of the invention can further comprise visibility tinting agents (e.g., D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, or mixtures thereof), antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), and the like, as known to a person skilled in the art.

In accordance with the invention, a polymerizable composition of the invention is a fluid composition which can be a solution. Such a polymerizable composition can be prepared by dissolving all of the desirable components in the organic solvent as known to a person skilled in the art.

In various preferred embodiments, a polymerizable composition of the invention comprises: (1) from about 5% to about 50% by weight, preferably from about 5% to about 45% by weight, more preferably from about 10% to about 40% by weight of at least one siloxane-containing (meth)acrylamido monomer; (2) from about 5% to about 50%, preferably from about 10% to about 45% by weight, more preferably from about 10% to about 40% by weight, of at least one polysiloxane vinylic crosslinker all of the ethylenically-unsaturated groups of which are (meth)acrylamido groups and or (meth)acryloxy groups; (3) from about 15% to about 55%, preferably from about 20% to about 50%, more preferably from about 20% to about 45%, even more preferably from about 20% to about 40% by weight, of at least one hydrophilic (meth)acrylamido monomer; (4) from about 0.05% to about 1.5% by weight, preferably from about 0.1% to 1.4% by weight, more preferably from about 0.2% to about 1.3% by weight of at least one thermal free radical initiator; and (5) from about 0.1% to about 2.5% by weight, preferably from about 0.2% to about 2.0% by weight, more preferably from about 0.3% to about 1.5% by weight, of at least one UV-absorbing vinylic monomer. The foregoing range combinations are presented with the proviso that the listed components and any additional components add up to 100% by weight.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The closed mold containing the polymerizable composition subsequently is cured (i.e., polymerized) thermally to produce a molded silicone hydrogel lens precursor. It is advantageous to previously degas the components and solvents used in the polymerization reaction. It is also advantageous to thermally cure the polymerizable composition in the oven under an inert atmosphere, e.g., under $N_2$ or Ar atmosphere.

Opening of the molds so that the molded SiHy t lens precursors can be removed from the molds may take place in a manner known per se.

The molded SiHy contact lens precursors can be subject to lens extraction with a liquid extraction medium to remove unpolymerized polymerizable components and formed oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The molded SiHy contact lens precursors can also subject to further processes, such as, for example, surface treatment (for example, such as, plasma treatment, chemical treatments, the grafting of hydrophilic monomers or macromers onto the surface of a lens, Layer-by-layer coating, in-package crosslinking of a thermally-reactive hydrophilic polymeric material, etc.); packaging in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), or an in-package-coating material; sterilization such as autoclave at from 118 to 124° C. for at least about 30 minutes; and the like.

Preferred surfaces treatments are LbL coating such as those described in U.S. Pat. Nos. 6,451,871, 6,719,929, 6,793,973, 6,811,805, 6,896,926, plasma treatment, in-package-coating such as those disclosed in U.S. Pat. Nos. 8,557,334, 8,529,057 and 9,505,184. A preferred plasma treatment is those processes in which an ionized gas is applied to the surface of an article as described in U.S. Pat. Nos. 4,312,575 and 4,632,844.

The molded SiHy lens precursor is hydrated in water or an aqueous solution to replace the liquid extraction medium, according to any method known to a skilled person.

The hydrated and/or surface-treated SiHy contact lens can further subject to further processes, such as, for example, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A silicone hydrogel contact lens of the invention has an oxygen permeability of preferably at least about 40 barrers, more preferably at least about 60 barrers, even more preferably at least about 80 barrers (at about 35° C.) when being fully hydrated.

A silicone hydrogel contact lens of the invention has an elastic modulus of about 1.5 MPa or less, preferably about 1.2 MPa or less, more preferably from about 0.3 MPa to about 1.0 MPa (at a temperature of from about 22° C. to 28° C.) when being fully hydrated.

A silicone hydrogel contact lens of the invention further has an equilibrium water content of from about 15% to about 75%, more preferably from about 20% to about 70% by weight, even more preferably from about 25% to about 65% by weight (at room temperature) when being fully hydrated. The equilibrium water content of a SiHy contact lens can be measured according to the procedure disclosed in Example 1.

In a further aspect, the invention provides a SiHy contact lens obtained by the method of the invention.

All of the various embodiments of the molds, polymerizable composition, and SiHy contact lens of the invention described above can be used in this aspect of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for making contact lenses, comprising the steps of:

(1) obtaining a fluid polymerizable composition, wherein the polymerizable materials comprises (a) at least one siloxane-containing (meth)acrylamido monomer, (b) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonyl-amino groups, vinyloxycarbonyloxy groups, or combinations thereof, (c) from about 15% to about 55% by weight of at least one hydrophilic (meth)acrylamido monomer having 3 to 8 carbon atoms, (d) from about 4% to about 20% by weight of an organic solvent having 3 to 8 carbon atoms relative to the total weight of the polymerizable composition, (e) at least one thermal free radical initiator having a 10-hour half-life temperature (designated as "$T_{10h\lambda}$") of from about 50° C. to about 90° C., wherein the sum of the amounts of components (a) to (c) is at least 90% by weight relative to total amount of all polymerizable components in the polymerizable composition;

(2) introducing the polymerizable composition into lens molds, wherein each lens mold comprises a male mold half having a first molding surface and a female mold half having a second molding surface, wherein the male and female mold halves are configured to receive each other such that a mold cavity is formed between the first and second molding surfaces when each lens mold is closed;

(3) curing thermally the polymerizable composition in the lens molds in an oven according to a curing profile to form silicone hydrogel lens precursors, wherein the curing profile comprises or consists essentially of increasing the oven's temperature from a first temperature, $T_1$, to a second temperature, $T_2$, at a ramping rate, $r_T$, and then lowring the oven's temperature from $T_2$ to $T_1$ or lower, wherein $$T_1 \leq (T_{10h\lambda} - 5)° \text{ C.}, \; T_2 \geq (T_{10h\lambda} + 30)° \text{ C.}, \; r_T = \frac{(T_2 - T_1)}{t}$$

in which t is a total curing time of from about 30 minutes to about 200 minutes;

(4) separating each lens molds into male and female mold halves, with one silicone hydrogel lens precursor being adhered on one lens-adhered mold half which is one of the male and female mold halves of each lens mold;

(5) removing silicone hydrogel lens precursors from lens-adhered mold halves; and (6) subjecting the silicone hydrogel lens precursors to one or more post-molding processes selected from the group consisting of extraction, surface treatment, hydration, packaging, sterilization, and combinations thereof, to form silicone hydrogel contact lenses.

2. The method of embodiment 1, wherein the sum of the amounts of components (a) to (c) is at least 92% by weight relative to total amount of all polymerizable components in the polymerizable composition.

3. The method of embodiment 1, wherein the sum of the amounts of components (a) to (c) is at least 94% by weight relative to total amount of all polymerizable components in the polymerizable composition.

4. The method of any one of embodiments 1 to 3, wherein the polymerizable composition comprises from about 4% to about 16% by weight of the organic solvent relative to the total weight of the polymerizable composition.
5. The method of any one of embodiments 1 to 3, wherein the polymerizable composition comprises from from about 4% to about 12% by weight of the organic solvent relative to the total weight of the polymerizable composition.
6. The method of any one of embodiments 1 to 3, wherein the polymerizable composition comprises from from from about 4% to about 10% by weight of the organic solvent relative to the total weight of the polymerizable composition.
7. The method of any one of embodiments 1 to 6, wherein the organic solvent is a $C_3$-$C_8$ alkyl alcohol
8. The method of any one of embodiments 1 to 7, wherein said at least one thermal free radical initiator has a 10-hour half-life temperature (designated as "$T_{10h\lambda}$") of from about 50° C. to about 90° C.
9. The method of any one of embodiments 1 to 7, wherein said at least one thermal free radical initiator has a 10-hour half-life temperature (designated as "$T_{10h\lambda}$") of from about 52° C. to about 67° C.
10. The method of embodiment 8 or 9, wherein $T_1$ is from room temperature to $(T_{10h\lambda}-5)$° C.
11. The method of any one of embodiments 8 to 10, wherein $T_2$ is from $(T_{10h\lambda}+30)$° C. to 120° C.
12. The method of any one of embodiments 1 to 11, wherein t is from about 30 minutes to about 150 minutes.
13. The method of any one of embodiments 1 to 11, wherein t is from about 30 minutes to about 100 minutes.
14. The method of any one of embodiments 1 to 13, wherein the organic solvent has a boiling point that is higher than $(T_{10h\lambda}+10$° C.).
15. The method of any one of embodiments 1 to 14, wherein said at least one hydrophilic (meth)acrylamido monomer comprises (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis (2-hydroxyethyl) (meth)acrylamide, N-tris(hydroxymethyl) methyl (meth)acrylamide, 2-(meth) acrylamidoglycolic acid, 3-(meth)acrylamido-propionic acid, 4-(meth)acrylamido-butanoic acid, 3-(meth)acrylamido-2-methylbutanoic acid, 3-(meth) acrylamido-3-methylbutanoic acid, 2-(meth)acrylamido-2-methyl-3,3-dimethyl butanoic acid, 5-(meth) acrylamidopentanoic acid, 3-(meth) acrylamidohaxanoic acid, 4-(meth)acrylamido-3,3-dimethylhexanoic acid, (3-(meth)acrylamidophenyl) boronic acid, 3-((3-methacrylamido-propyl) dimethylammonio)-propane-1-sulfonate; 3-((3-acrylamidopropyl)dimethylammonio)-propane-1-sulfonate, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, poly(ethylene glycol)ethyl (meth)acrylamide having a number average molecular weight of up to 700, methoxy-poly (ethylene glycol)ethyl (meth)acrylamide having a number average molecular weight of up to 700, or combination thereof.
16. The method of any one of embodiments 1 to 14, wherein said at least one hydrophilic (meth)acrylamido monomer comprises N,N-dimethyl (meth)acrylamide, N-ethyl (meth)acrylamide, N-2-hydroxyethyl (meth) acrylamide, N-3-hydroxypropyl (meth)acrylamide, N-2-hydroxypropyl (meth)acrylamide, N-2,3-dihydroxypropyl (meth)acrylamide, (meth)acrylamide, N-(2-aminoethyl)(meth)acrylamide, N-(3-aminopropyl)(meth)acrylamide, or combinations thereof, more preferably is N,N-dimethylacrylamide.
17. The method of any one of embodiments 1 to 14, wherein said at least one hydrophilic (meth)acrylamido monomer comprises N,N-dimethyl (meth)acrylamide.
18. The method of any one of embodiments 1 to 17, wherein said at least one siloxane-containing (meth) acrylamido monomer comprises a (meth)acrylamido monomer containing a tris(trialkylsiloxy)silyl group.
19. The method of embodiment 18, wherein the (meth) acrylamido monomer containing a tris(trialkylsiloxy) silyl group is N-[tris(trimethylsiloxy)silylpropyl] (meth)acrylamide, N-[tris(dimethylethylsiloxy)-silylpropyl] (meth)acrylamide, N-[tris(dimethylpropylsiloxy)silylpropyl]-acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) acrylamide, N,N-bis[2-hydroxy-3-(3-(tris(trimethylsilyloxy)silyl) propyloxy)propyl]-2-methyl acrylamide, N,N-bis[2-hydroxy-3-(3-(tris(trimethylsilyloxy)silyl)propyloxy) propyl] acrylamide, or a combination thereof.
20. The method of any one of embodiments 1 to 19, wherein said at least one siloxane-containing (meth) acrylamido monomer comprises a (meth)acrylamido monomer containing a bis(trialkylsilyloxy)alkylsilyl group.
21. The method of embodiment 20, wherein the (meth) acrylamido monomer containing a bis(trialkylsilyloxy) alkylsilyl group is N-(2-hydroxy-3-(3-(bis(trimethylsilyloxy)methylsilyl)-propyloxy)propyl)-2-methyl acrylamide, N-(2-hydroxy-3-(3-(bis(trimethylsilyloxy)-methylsilyl)-propyloxy)propyl) acrylamide, N,N-bis[2-hydroxy-3-(3-(bis(trimethylsilyloxy)-methylsilyl)-propyloxy)propyl]-2-methyl acrylamide, N,N-bis[2-hydroxy-3-(3-(bis(trimethylsilyloxy)methylsilyl)-propyloxy)propyl] acrylamide, N-[2-hydroxy-3-(3-(t-butyldimethylsilyl)propyloxy)propyl]-2-methyl acrylamide, a siloxane-containing (meth)acrylamido monomer of one of formula (Ia) to (Ih)

(Ia)

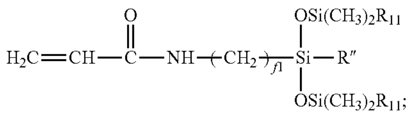

(Ib)

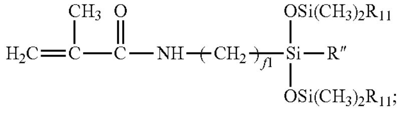

-continued (Ic)

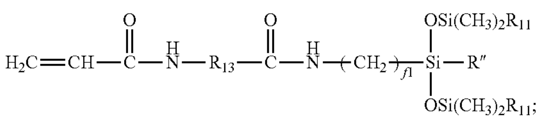

(Id)

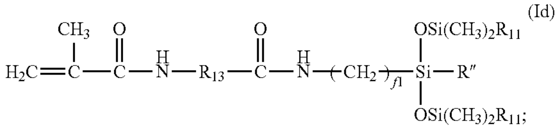

(Ie)

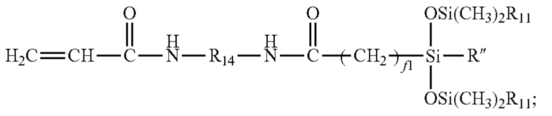

(If)

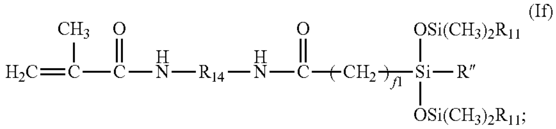

(Ig)

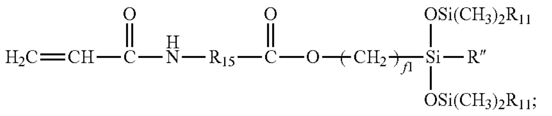

(Ih)

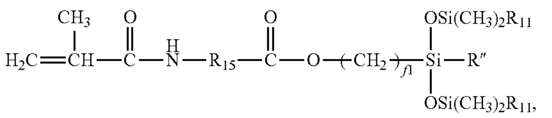

in which $R_{13}$ is a divalent alkylene radical of $—CH_2CH_2—$, $—CH_2CH_2CH_2—$, $—CH_2CH_2CH_2CH_2—$,

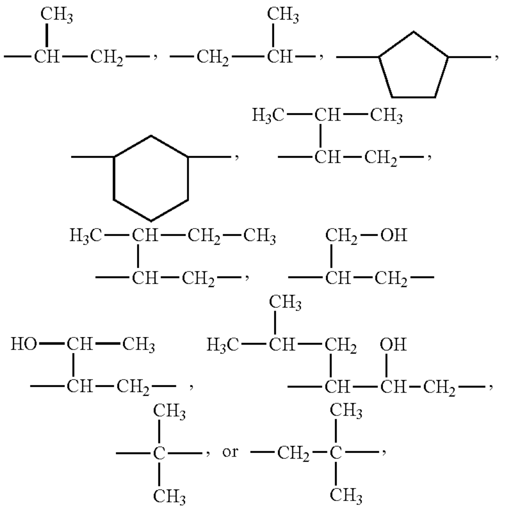

$R_{14}$ is a divalent alkylene radical of $—CH_2CH_2—$ or $—CH_2CH_2CH_2—$, and $R_{15}$ is a divalent alkylene radical of

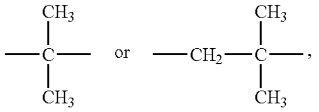

R" and $R_{11}$ independent of each other is $C_1$-$C_4$ alkyl, and f1 is an integer of from 3 to 5.

22. The method of any one of embodiments 1 to 18, wherein said at least one siloxane-containing (meth) acrylamido monomer comprises a mono-(meth)acrylamido-terminated oligo- or polysiloxane of formula (IIa)

(IIa)

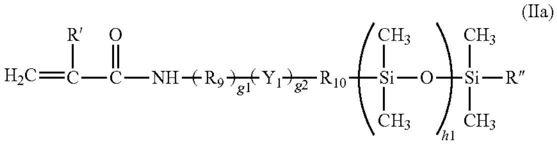

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

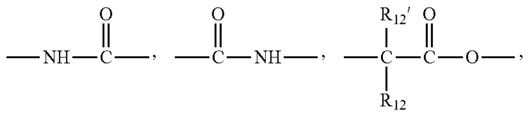

in which $R_{12}$ and $R_{12}$' independent of each other are $C_1$-$C_6$ alkyl.

23. The method of embodiment 22, wherein in formula (IIa) h1 is an integer of 3 to 20 (more preferably 3 to 15)

24. The method of embodiment 22 or 23, wherein in formula (IIa) $R_{12}$ and $R_{12}$' independent of each other are methyl.

25. The method of any one of embodiments 1 to 24, wherein said at least one polysiloxane vinylic crosslinker comprises: an α,ω-(meth)acryloxy-terminated polydimethylsiloxane; an α,ω-(meth)acrylamido-terminated polydimethylsiloxane; an α,ω-vinyloxycarbonyloxy-terminated polydimethylsiloxane; an α,ω-vinyloxycarbonylamino-terminated polydimethylsiloxane; a bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane of various molecular weight; a reaction product of glycidyl methacrylate with a di-amino-functionalized polydimethylsiloxane; a reaction product of an azlactone-containing vinylic monomer with a d-hydroxyl-functionalized polydimethylsiloxane; or combinations thereof.

26. The method of any one of embodiments 1 to 25, wherein said at least one polysiloxane vinylic crosslinker comprises a vinylic crosslinker of formula (H)

(H)

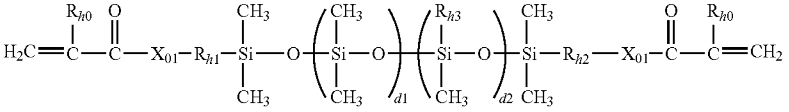

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{01}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of —$R_{h4}$—O—$R_{h5}$— in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

(H-a)

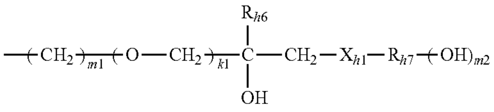

(H-b)

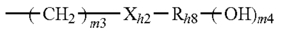

(H-c)

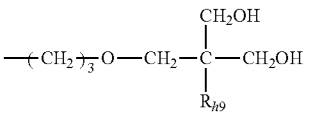

(H-d)

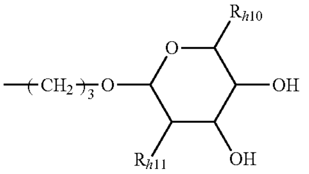

(H-e)

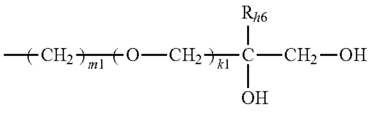

k1 is zero or 1; m1 is an integer of 2 to 4; m2 is an integer of 1 to 5; m3 is an integer of 3 to 6;

m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

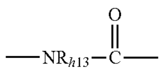 or 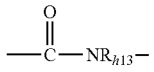

in which $R_{h13}$ is hydrogen or $C_1$-$C_{10}$ alkyl.

27. The method of any one of embodiments 1 to 26, wherein said at least one polysiloxane vinylic crosslinker comprises: (1) a vinylic crosslinker which comprises one sole polysiloxane segment and two terminal ethylenically-unsaturated groups selected from the group consisting of (meth)acryloyloxy groups, (meth)acryloylamino groups, vinyloxycarbonyloxy groups, vinyloxycarbonylamino groups; and/or (2) a chain-extended polysiloxane vinylic crosslinker which comprises at least two polysiloxane segment and a covalent linker between each pair of polysiloxane segments and two two terminal ethylenically-unsaturated groups selected from the group consisting of (meth)acryloyloxy groups, (meth)acryloylamino groups, vinyloxycarbonyloxy groups, vinyloxycarbonylamino groups.

28. The method of any one of embodiments 1 to 27, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxy-ethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxy-propyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxy-propyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamido-propylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)

acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]terminated polydimethylsiloxane, or combinations thereof.

29. The method of any one of embodiments 1 to 28, wherein said at least one thermal free radical initiator is an azo-containing radical initiator.
30. The method of any one of embodiments 1 to 29, wherein the polymerizable composition comprises from about 15% to about 55% by weight of said at least one hydrophilic (meth)acrylamido monomer.
31. The method of any one of embodiments 1 to 29, wherein the polymerizable composition comprises from about 20% to about 50% by weight of said at least one hydrophilic (meth)acrylamido monomer.
32. The method of any one of embodiments 1 to 29, wherein the polymerizable composition comprises from about 20% to about 45% by weight of said at least one hydrophilic (meth)acrylamido monomer.
33. The method of any one of embodiments 1 to 29, wherein the polymerizable composition comprises from about 20% to about 40% by weight of said at least one hydrophilic (meth)acrylamido monomer.
34. The method of any one of embodiments 1 to 33, wherein the polymerizable composition comprises from about 5% to about 50% by weight of said at least one siloxane-containing (meth)acrylamido monomer.
35. The method of any one of embodiments 1 to 33, wherein the polymerizable composition comprises from about 5% to about 45% by weight of said at least one siloxane-containing (meth)acrylamido monomer.
36. The method of any one of embodiments 1 to 33, wherein the polymerizable composition comprises from about 10% to about 40% by weight of said at least one siloxane-containing (meth)acrylamido monomer.
37. The method of any one of embodiments 1 to 36, wherein the polymerizable composition comprises from about 5% to about 50% by weight of said at least one polysiloxane vinylic crosslinker.
38. The method of any one of embodiments 1 to 36, wherein the polymerizable composition comprises from about 10% to about 45% by weight of said at least one polysiloxane vinylic crosslinker.
39. The method of any one of embodiments 1 to 36, wherein the polymerizable composition comprises from about 10% to about 40% by weight of said at least one polysiloxane vinylic crosslinker.
40. The method of any one of embodiments 1 to 39, wherein the polymerizable composition comprises from about 0.05% to about 2.0% by weight of said at least one thermal free radical initiator, relative to the total weight of the polymerizable composition.
41. The method of any one of embodiments 1 to 39, wherein the polymerizable composition comprises from about 0.1% to about 1.75% by weight of said at least one thermal free radical initiator, relative to the total weight of the polymerizable composition.
42. The method of any one of embodiments 1 to 39, wherein the polymerizable composition comprises from about 0.15% to about 1.5% by weight of said at least one thermal free radical initiator, relative to the total weight of the polymerizable composition.
43. The method of any one of embodiments 1 to 39, wherein the polymerizable composition comprises from about 0.2% to about 1.25% by weight of said at least one thermal free radical initiator, relative to the total weight of the polymerizable composition.
44. The method of any one of embodiments 1 to 43, wherein the polymerizable composition comprises at least one UV-absorbing vinylic monomer and/or at least one UV/HEVL-Absorbing vinylic monomer.
45. The method of embodiment 44, wherein the polymerizable composition comprises 2-[2'-hydroxy-5'-(2-methacryloxyethyl)phenyl)]-2H-benzotriazole (Norbloc).
46. The method of any one of embodiments 1 to 45, wherein the polymerizable composition further comprise about 10% by weight or less of additional polymerizable components selected from the group consisting of one or more secondary hydrophilic vinylic monomers (i.e., hydrophilic vinylic monomers other than hydrophilic (meth)acrylamido monomer), one or more secondary siloxane-containing vinylic monomers (i.e., siloxane-containing vinylic monomers other than siloxane-containing acrylamido monomer), one or more hydrophobic vinylic monomers, one or more non-silicone vinylic crosslinkers, and combinations thereof.
47. The method of embodiment 46, wherein the polymerizable composition further comprise at least one secondary hydrophilic vinylic monomer which comprises:

(1) a hydroxyl-containing (meth)acryloxy monomer selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, and combinations thereof;

(2) a carboxyl-containing (meth)acryloxy monomer selected from the group consisting of (meth)acrylic acid, ethylacrylic acid, and combinations thereof;

(3) an amino-containing (meth)acryloxy monomer selected from the group consisting of 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof;

(4) an N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6- methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof;

(5) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof;

(6) a (meth)acryloxy monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly (ethylene glycol) (meth)acrylate having a number average molecular weight of up to 1500, and combinations thereof;

(7) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof;

(8) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof;

(9) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloyl-amino] butyl-2'-(trimethylammonio)ethylphosphate, 5-((meth) acryloyloxy)pentyl-2'-(trimethylammonio)ethyl phosphate, 6-((meth)acryloyloxy)hexyl-2'-(trimethylammonio)ethylphosphate, 2-((meth)acryloyloxy)ethyl-2'-(triethylammonio)-ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)-propyl-2'-(trimethylammonio)-ethylphosphate, 2-((meth)acryloyloxy) butyl-2'-(trimethyl-ammonio)ethylphosphate, 2-((meth)acryloyloxy)pentyl-2'-(trimethylammonio)-ethylphosphate, 2-((meth)acryloyloxy)hexyl-2'-(trimethylammonio)ethylphosphate, 2-(vinyloxy)ethyl-2'-(trimethylammonio)ethylphosphate, 2-(allyloxy)ethyl-2'-(trimethyl-ammonio)ethylphosphate, 2-(vinyloxycarbonyl)ethyl-2'-(trimethylammonio) ethyl phosphate, 2-(allyloxycarbonyl)ethyl-2'-(trimethylammonio)-ethylphosphate, 2-(vinylcarbonylamonio)ethyl-2'-(trimethylammonio)ethylphosphate, 2-(allyloxycarbonyl-amino)ethyl-2'-(trimethylammonio)ethyl phosphate, 2-(butenoyloxy)ethyl-2'-(trimethylammonio)ethylphosphate, and combinations thereof;

(10) allyl alcohol;

(11) N-2-hydroxyethyl vinyl carbamate;

(12) N-vinyloxycarbonyl-β-alanine (VINAL);

(13) N-vinyloxycarbonyl-α-alanine; or

(14) combinations thereof.

48. The method of embodiment 46 or 47, wherein the polymerizable composition further comprise at least one secondary siloxane-containing vinylic monomer which comprises at least one siloxane-containing vinylic monomer of formula (M1) or (M2):

(M1)

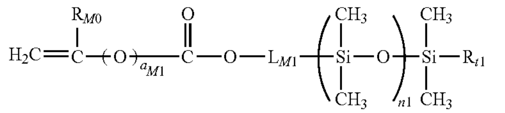

(M2)

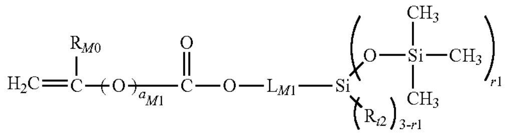

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $$-L_{M1}'-X_{M1}-L_{M1}''-,\quad -(C_2H_4O)_{v1}CONH-L_{M1}''-,$$

$$-(C_2H_4O)_{v1}L_{M1}''-,\quad -L_{M1}'-NHCOO-(C_2H_4O)_{v1}L_{M1}''-,$$

$$-CH_2-CH(OH)-CH_2-X_{M1}'(C_2H_4O)_{v2}L_{M1}''-,$$

$$-L_{M1}'-X_{M1}'-CH_2-CH(OH)-CH_2-O-L_{M1}''-,\ \text{or}$$

$$-(C_2H_4O)_{v1}CH_2-CH(OH)-CH_2-O-L_{M1}''-;$$

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

49. The polymerizable composition of any one of embodiments 46 to 48, wherein the polymerizable composition further comprise at least one secondary siloxane-containing vinylic monomer which comprises tris(trimethylsilyloxy)silylpropyl (meth)acrylate, [3-(meth)acryloxy-2-hydroxypropyloxy]propylbis(trimethylsiloxy)

methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, or a combination thereof.

50. The polymerizable composition of any one of embodiments 46 to 48, wherein the polymerizable composition further comprise at least one non-silicone vinylic crosslinking agent selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, 3,4-bis[(meth)acryloyl]tetrahydrofuran, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-(meth)acrylamide, and combinations thereof.

51. The method of any one of embodiments 1 to 50, wherein the polymerizable composition is degassed to minimize the concentration of $O_2$ in the polymerizable composition.

52. The method of any one of embodiments 1 to 51, wherein the step of curing thermally in the oven is carried out under $N_2$ or Ar atmosphere, wherein the $N_2$ or Ar environment in the oven is maintained by flowing $N_2$ or Ar through the oven at a flow rate.

53. A silicone hydrogel contact lens obtained according to a method of any one of embodiments 1 to 52, wherein the silicone hydrogel contact lens has: an oxygen permeability of at least about 40 barrers (preferably at least about 60 barrers, more preferably at least about 80 barrers) (at about 35° C.); an elastic modulus of about 2.0 MPa or less (preferably about 1.5 MPa or less, more preferably about 1.2 or less, even more preferably from about 0.4 MPa to about 1.0 MPa) (at a temperature of from 22° C. to 28° C.); and/or a water content of from about 15% to about 70% (preferably from about 20% to about 50% by weight) (at a temperature of from 22° C. to 28° C.) when fully hydrated.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Determination of Diameter of Hydrated Contact Lens

FIG. 1 shows schematically the general lens dimensions which are typically determined by a contact lens manufacturer. The general dimensions include center thickness (CT) (110), anterior sagittal height (ASag) (120), posterior sagittal height (PSag) (140), base curve equivalent (BCE) (150), edge thickness (ET) (160), and diameter (180). Measurements of the general lens dimensions can be carried out on fully hydrated contact lenses in a wetcell by using a low coherence interferometer similar to that described by Heidemana and Greivenkampin in their paper (Optical Engineering 55(3), 034106 (March 2016)).

For measurements, a contact lens is seated on the flate bottom surface of the wetcell which is filled with a phosphate buffered saline and a low coherence interferometer is placed at the geometric center of the lens using a motion controller. The interferometer measures thicknesses of material based off of reflections between different material surfaces. The center of the lens is determined by the measurement by the camera.

The diameter is defined as the outermost edge of the lens viewed from above the lens. The edge points are fit to an ellipse and the diameter is calculated as the average of the major and minor ellipse diameters. Typically, contact lenses have highly circular diameters and either a circular or elliptical fitting will result in similar values. However, if a lens is slightly out of round, an ellipse more accurately describes the shape of the contact lens diameter than a circle. The lens diameters of 3 to 10 contact lenses from one single batch of contact lenses are measured and averaged to obtain the averaged lens diameter for that batch of contact lenses.

Chemicals

CE-PDMS represents a polysiloxane vinylic crosslinker (Mw~11-12 KDa determined by $H^1$ NMR spectroscopy) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; TRIS-Am represents N-[tris(trimethylsiloxy)-silylpropyl]acrylamide; DMA represent N,N-dimethylacrylamide; Vazo-64 represents 2,2'-dimethyl-2,2'azodipropiononitrile; Norbloc is 2-[2'-hydroxy-5'-(2-methacryloxyethyl)phenyl)]-2H-benzotriazole; UV28 is 2-(3'-tert-butyl-2'-hydroxy-5'-(3"-methacryloyloxypropoxy) phenyl)-5-chloro-2H-benzotriazole; PrOH represents n-propanol.

Example 2 (Comparative)

Preparation of Lens Formulations

A lens formulation is prepared to have the following composition: 10 parts by weight of PrOH; 32 parts by weight of DMA; 1.5 parts by weight of Norbloc; 0.4 parts by weight of UV28; 28 parts by weight of TRIS-Am; 40 parts by weight of CE-PDMS; and 0.5 part by weight of Vazo-64. All components are added into a clean bottle, with a stir bar to mix at 600 rpm for 30 minutes at room temperature. After all the solid is dissolved, the formulation is filtered with a glass micro filter (2.7 μm GMF filter).

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds. The molds with the lens formulation therein are placed in an oven having room temperature. Then, the oven is N2-purged for 30 minutes, heated to 55° C. at a ramp rate of about 7° C./minute and holding at 55° C. for 40 minutes and then proceeded with the thermal curing process according to a curing profile (heating from 55° C. to 80° C. at a ramp rate of about 7° C./minute and holding at 80° C. for 40 minutes; heating from 80° C. to 100° C. at a ramp rate of about 7° C./minute and holding at 100° C. for 40 minutes).

Lens molds each with one molded silicone hydrogel lens precursor therein are mechanically opened. The molded silicone hydrogel precursors adhere to the male mold halves.

After de-molding, cast-molded SiHy lens precursors are subjected to the following post-molding process: extracted with PrOH for 180 minutes, dip-coated in a coating solution of polyacrylic acid (PAA, Mw 450K) (ca. 0.1% by weight) in PrOH for about 20 minutes; rinsed in a mixture of 1:1 PROH:water for about 20 miutes; rinsed in PB (phosphate buffer containing about 0.077 wt. % $NaH_2PO_4 \cdot H_2O$ and about 0.31 wt. % $Na_2HPO_4 \cdot 2H_2O$) for 50 minutes, to obtained hydrated silicone hydrogel contact leses each having one PAA coating thereon. Then, the resultant silicone hydrogel contact lenses are packaged/sealed in polypropylene lens packaging shells (or blisters) (one lens per shell) with 0.65 mL of an in-package-coating packaging saline which is prepared according to the procedure described in Example 19 of U.S. Pat. No. 8,480,227, and then autoclaved (sterilized) at 121° C. for 45 minutes.

Example 3

A lens formulation prepared according to the procedures described in Example 2 is used.

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds. The molds with the lens formulation therein are placed in an oven having room temperature and the oven is $N_2$-purged for 30 minutes. The molds with the lens formulation therein are placed in an oven having room temperature. Then, the oven is $N_2$-purged for 30 minutes, and then proceeded with the thermal curing process according to a curing profile (heating from room temperature to 110° C. at a ramp rate of about 5° C./minute and coiling down directly).

Lens molds each with one molded silicone hydrogel lens precursor therein are mechanically opened. The molded silicone hydrogel precursors adhere to the male mold halves.

After de-molding, cast-molded SiHy lens precursors are subjected to the following post-molding process: extracted with PrOH for 180 minutes, dip-coated in a coating solution of polyacrylic acid (PAA, Mw 450 K) (ca. 0.1% by weight) in PrOH for about 20 minutes; rinsed in a mixture of 1:1 PROH:water for about 20 miutes; rinsed in PB (phosphate buffer containing about 0.077 wt. % $NaH_2PO_4 \cdot H_2O$ and about 0.31 wt. % $Na_2HPO_4 \cdot 2H_2O$) for 50 minutes, to obtained hydrated silicone hydrogel contact leses each having one PAA coating thereon. Then, the resultant silicone hydrogel contact lenses are packaged/sealed in polypropylene lens packaging shells (or blisters) (one lens per shell) with 0.65 mL of an in-package-coating packaging saline which is prepared according to the procedure described in Example 19 of U.S. Pat. No. 8,480,227, and then autoclaved (sterilized) at 121° C. for 45 minutes.

Example 4

The lens diameters of hydrated silicone hydrogel contact lenses prepared above are determined according to the procedures described in Example 1. The lens diameter as function of the positions of molds in the oven for making the SiHy lens precursors are reported in Table 1.

TABLE 1

| | Lens Diameter (mm) re. mold position in oven | | |
|---|---|---|---|
| | Bottom | Middle | Top |
| Example 2 (Comparative) | 13.99 | 14.06 | 14.12 |
| Example 3 | 14.30 | 14.30 | 14.29 |

Example 5 (Comparative)

A lens formulation is prepared to have the following composition: 5 parts by weight of PrOH; 33 parts by weight of DMA; 34 parts by weight of TRIS-Am; 34 parts by weight of CE-PDMS; and 0.5 part by weight of Vazo-64. All components are added into a clean bottle, with a stir bar to mix at 600 rpm for 30 minutes at room temperature. After all the solid is dissolved, the formulation is filtered with a glass micro filter (2.7 μm GMF filter).

Lens Fabrication

Lenses are prepared by cast-molding from a lens formulation prepared above. The lens formulation is purged with nitrogen at room temperature for 30 to 35 minutes. The N2-purged lens formulation is introduced into polypropylene molds. The molds with the lens formulation therein are placed in an oven having room temperature and the oven is N2-purged for 30 minutes. The molds with the lens formulation therein are placed in an oven having room temperature. Then, the oven is N2-purged for 30 minutes, heated to 55° C. at a ramp rate of about 7° C./minute and holding at 55° C. for 40 minutes and then proceeded with the thermal curing process according to a curing profile (heating from 55° C. to 80° C. at a ramp rate of about 7° C./minute and holding at 80° C. for 40 minutes; heating from 80° C. to 100° C. at a ramp rate of about 7° C./minute and holding at 100° C. for 40 minutes).

Lens molds each with one molded silicone hydrogel lens precursor therein are mechanically opened. The molded silicone hydrogel precursors adhere to the male mold halves.

After de-molding, cast-molded SiHy lens precursors are subjected to the following post-molding process: extracted with PrOH for 180 minutes, dip-coated in a coating solution of polyacrylic acid (PAA, Mw 450 K) (ca. 0.1% by weight) in PrOH for about 20 minutes; rinsed in a mixture of 1:1 PROH:water for about 20 miutes; rinsed in PB (phosphate buffer containing about 0.077 wt. % $NaH_2PO_4 \cdot H_2O$ and about 0.31 wt. % $Na_2HPO_4 \cdot 2H_2O$) for 50 minutes, to obtained hydrated silicone hydrogel contact leses each having one PAA coating thereon. Then, the resultant silicone hydrogel contact lenses are packaged/sealed in polypropylene lens packaging shells (or blisters) (one lens per shell) with 0.65 mL of an in-package-coating packaging saline which is prepared according to the procedure described in Example 19 of U.S. Pat. No. 8,480,227, and then autoclaved (sterilized) at 121° C. for 45 minutes.

The lens diameter as function of the positions of molds in the oven for making the SiHy lens precursors are reported in Table 2.

Example 6

A lens formulation prepared according to the procedures described in Example 5 is used.

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds. The molds with the lens formulation therein are placed in an oven having room temperature and the oven is N2-purged for 30 minutes. The molds with the lens formulation therein are placed in an oven having room temperature. Then, the oven is $N_2$-purged for 30 minutes, heated to 55° C. at a ramp rate of about 7° C./minute and holding at 55° C. for 40 minutes and then proceeded with the thermal curing process according to a curing profile (heating from 55° C. to 100° C. at a ramp rate of about 7° C./minute and holding at 100° C. for 40 minutes).

Lens molds each with one molded silicone hydrogel lens precursor therein are mechanically opened. The molded silicone hydrogel precursors adhere to the male mold halves.

After de-molding, cast-molded SiHy lens precursors are subjected to the following post-molding process: extracted with PrOH for 180 minutes, dip-coated in a coating solution of polyacrylic acid (PAA, Mw 450 K) (ca. 0.1% by weight) in PrOH for about 20 minutes; rinsed in a mixture of 1:1 PROH:water for about 20 miutes; rinsed in PB (phosphate buffer containing about 0.077 wt. % $NaH_2PO_4 \cdot H_2O$ and about 0.31 wt. % $Na_2HPO_4 \cdot 2H_2O$) for 50 minutes, to obtained hydrated silicone hydrogel contact leses each having one PAA coating thereon. Then, the resultant silicone hydrogel contact lenses are packaged/sealed in polypropylene lens packaging shells (or blisters) (one lens per shell) with 0.65 mL of an in-package-coating packaging saline which is prepared according to the procedure described in Example 19 of U.S. Pat. No. 8,480,227, and then autoclaved (sterilized) at 121° C. for 45 minutes.

The lens diameter as function of the positions of molds in the oven for making the SiHy lens precursors are reported in Table 2.

Example 7

The lens diameters of hydrated silicone hydrogel contact lenses prepared in Experiments 5 and 6 are determined according to the procedures described in Example 1. The lens diameter as function of the positions of molds in the oven for making the SiHy lens precursors are reported in Table 2.

TABLE 2

| | Lens Diameter (mm) re. mold position in oven | | |
|---|---|---|---|
| | Bottom | Middle | Top |
| Example 5 (Comparative) | 13.99 | 14.06 | 14.13 |
| Example 6 | 14.10 | 14.11 | 14.13 |

All the publications and patents which have been cited herein above are hereby incorporated by reference in their entireties.

What is claimed is:

1. A method for making contact lenses, comprising the steps of:

(1) obtaining a fluid polymerizable composition, wherein the polymerizable materials comprises (a) at least one siloxane-containing (meth)acrylamido monomer, (b) at least one polysiloxane vinylic crosslinker, wherein all ethyleneically unsaturated groups of said at least one polysiloxane vinylic crosslinker are (meth)acrylamido groups, (meth)acryloxy groups, vinyloxycarbonyl-amino groups, vinyloxycarbonyloxy groups, or combinations thereof, (c) from about 15% to about 55% by weight of at least one hydrophilic (meth)acrylamido monomer having 3 to 8 carbon atoms, (d) from about 4% to about 20% by weight of an organic solvent having 3 to 8 carbon atoms relative to the total weight of the polymerizable composition, (e) at least one thermal free radical initiator having a 10-hour half-life temperature (designated as "$T_{10h\lambda}$") of from about 50° C. to about 90° C., wherein the sum of the amounts of components (a) to (c) is at least 90% by weight relative to total amount of all polymerizable components in the polymerizable composition;

(2) introducing the polymerizable composition into lens molds, wherein each lens mold comprises a male mold half having a first molding surface and a female mold half having a second molding surface, wherein the male and female mold halves are configured to receive each other such that a mold cavity is formed between the first and second molding surfaces when each lens mold is closed;

(3) curing thermally the polymerizable composition in the lens molds in an oven according to a curing profile to form silicone hydrogel lens precursors, wherein the curing profile comprises or consists essentially of increasing the oven's temperature from a first temperature, $T_1$, to a second temperature, $T_2$, at a ramping rate, $r_T$, and then lowering the oven's temperature from $T_2$ to $T_1$ or lower, wherein $$T_1 \le (T_{10h\lambda} - 5)^\circ \text{ C.}, \; T_2 \ge (T_{10h\lambda} + 30)^\circ \text{ C.}, \; r_T = \frac{(T_2 - T_1)}{t}$$

(° C./minute) in which t is a total curing time of from about 30 minutes to about 200 minutes;

(4) separating each lens molds into male and female mold halves, with one silicone hydrogel lens precursor being adhered on one lens-adhered mold half which is one of the male and female mold halves of each lens mold;

(5) removing silicone hydrogel lens precursors from lens-adhered mold halves; and (6) subjecting the silicone hydrogel lens precursors to one or more post-molding processes selected from the group consisting of extraction, surface treatment, hydration, packaging, sterilization, and combinations thereof, to form silicone hydrogel contact lenses.

2. The method of claim 1, wherein the organic solvent is a $C_3$-$C_8$ alkyl alcohol.

3. The method of claim 2, wherein $T_1$ is from room temperature to $(T_{10h\lambda}-5)$° C.

4. The method of claim 3, wherein $T_2$ is from $(T_{10h\lambda}+30)$° C. to 120° C.

5. The method of claim 4, wherein t is from about 30 minutes to about 150 minutes.

6. The method of claim 5, wherein the organic solvent has a boiling point that is higher than $(T_{10h\lambda}+10$° C.).

7. The method of claim 6, wherein said at least one hydrophilic (meth)acrylamido monomer comprises (meth) acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth) acrylamide, N-4-hydroxybutyl (meth)acrylamide, N,N-bis (2-hydroxyethyl) (meth)acrylamide, N-tris(hydroxymethyl) methyl (meth)acrylamide, 2-(meth)acrylamidoglycolic acid, 3-(meth)acrylamido-propionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth) acrylamidophenyl)boronic acid, 3-((3-methacrylamidopropyl)dimethylammonio)-propane-1-sulfonate; 3-((3-acrylamidopropyl)dimethylammonio)propane-1-sulfonate, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, poly (ethylene glycol)ethyl (meth)acrylamide having a number average molecular weight of up to 700, methoxy-poly(ethylene glycol)ethyl (meth)acrylamide having a number average molecular weight of up to 700, or combination thereof, wherein said at least one siloxane-containing (meth)acrylamido monomer comprises a (meth)acrylamido monomer containing a tris(trialkylsiloxy)silyl or bis(trialkylsilyloxy)alkylsilyl group and/or a mono-(meth)acrylamido-terminated oligo- or polysiloxane, wherein the (meth)acrylamido monomer containing a tris(trialkylsiloxy)silyl group is N-[tris(trimethylsiloxy)silylpropyl] (meth)acrylamide, N-[tris(dimethylethylsiloxy)-silylpropyl] (meth)acrylamide, N-[tris(dimethylpropylsiloxy)silylpropyl]acrylamide, N-[tris (dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) acrylamide, N,N-bis[2-hydroxy-3-(3-(tris (trimethylsilyloxy)silyl)propyloxy)propyl]-2-methyl acrylamide, N,N-bis[2-hydroxy-3-(3-(tris(trimethylsilyloxy)silyl)propyloxy)propyl] acrylamide, or a combination thereof, wherein the (meth)acrylamido monomer containing a bis(trialkylsilyloxy)alkylsilyl group is N-(2-hydroxy-3-(3-(bis(trimethylsilyloxy)methylsilyl)-propyloxy)propyl)-2-methyl acrylamide, N-(2-hydroxy-3-(3-(bis (trimethylsilyloxy)-methylsilyl)propyloxy)propyl) acrylamide, N,N-bis[2-hydroxy-3-(3-(bis(trimethylsilyloxy)-methylsilyl)propyloxy)propyl]-2-methyl acrylamide, N,N-bis[2-hydroxy-3-(3-(bis(trimethylsilyloxy) methylsilyl)propyloxy)propyl] acrylamide, N-[2-hydroxy-3-(3-(t-butyldimethylsilyl)propyloxy)propyl]-2-methyl acrylamide, a siloxane-containing (meth) acrylamido monomer of one of formula (Ia) to (Ih)

(Ia)

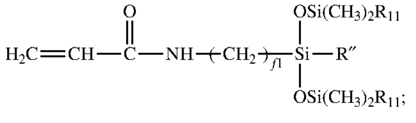

(Ib)

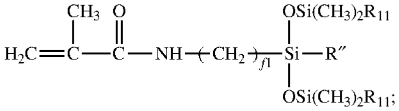

(Ic)

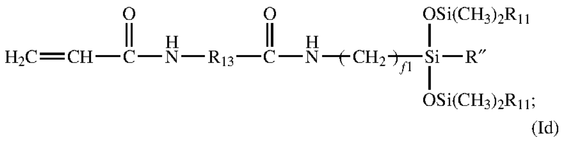

(Id)

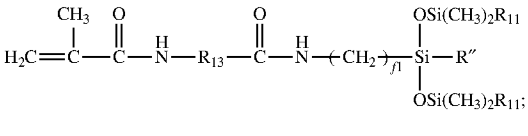

(Ie)

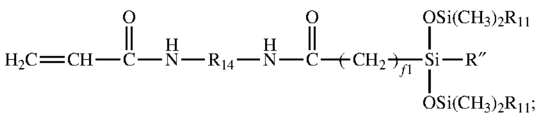

-continued (If)

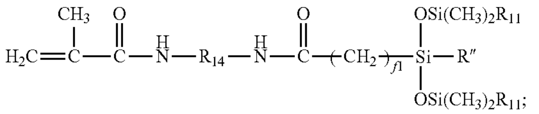

(Ig)

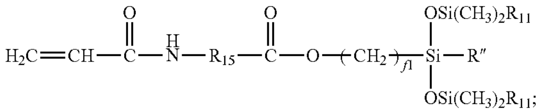

(Ih)

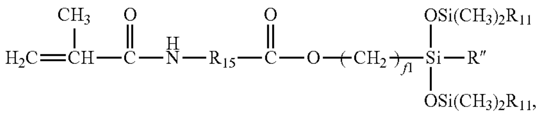

in which $R_{13}$ is a divalent alkylene radical of $—CH_2CH_2—$, $—CH_2CH_2CH_2—$, $—CH_2CH_2CH_2CH_2—$,

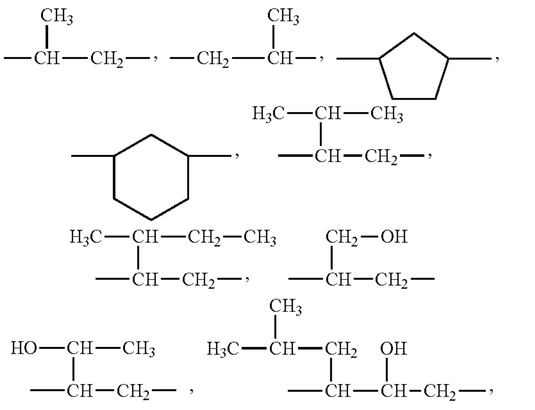

R" and $R_{11}$ independent of each other is $C_1$-$C_4$ alkyl, and f1 is an integer of from 3 to 5, wherein the mono-(meth)acrylamido-terminated oligo- or polysiloxane is represented by formula (IIa)

(IIa)

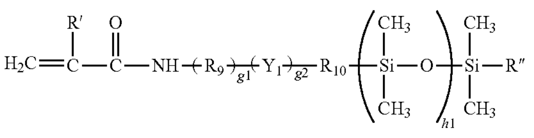

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

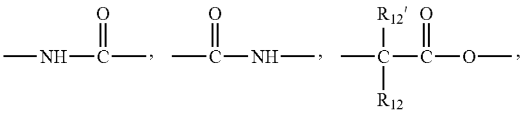

in which $R_{12}$ and $R_{12}'$ independent of each other are $C_1$-$C_6$ alkyl.

8. The method of claim 7, wherein said at least one polysiloxane vinylic crosslinker comprises:

(1) a vinylic crosslinker of formula (H)

(H)

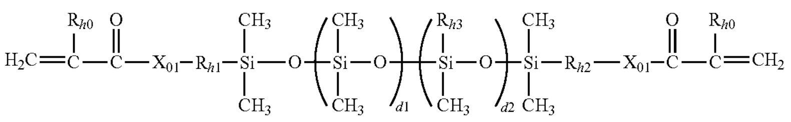

-continued

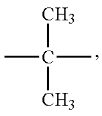

or

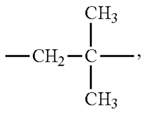

$R_{14}$ is a divalent alkylene radical of $—CH_2CH_2—$ or $—CH_2CH_2CH_2—$, and $R_{15}$ is a divalent alkylene radical of

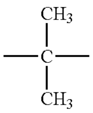

or

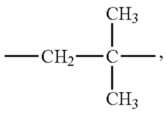

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{01}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of $—R_{h0}—O—R_{h5}—$ in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

(H-a)

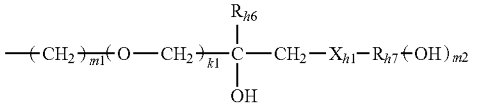

(H-b)

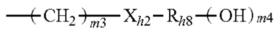

(H-c)

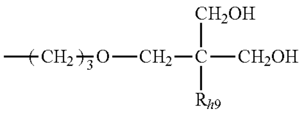

(H-d)

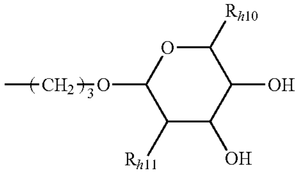

(H-e)

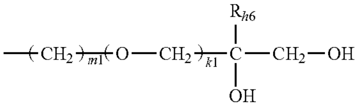

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

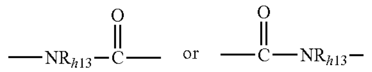

in which $R_{h13}$ is hydrogen or $C_1$-$C_{10}$ alkyl, (2) a vinylic crosslinker which comprises one sole polysiloxane segment and two terminal ethylenically-unsaturated groups selected from the group consisting of (meth)acryloyloxy groups, (meth)acryloylamino groups, vinyloxycarbonyloxy groups, vinyloxycarbonylamino groups;

(3) a chain-extended polysiloxane vinylic crosslinker which comprises at least two polysiloxane segment and a covalent linker between each pair of polysiloxane segments and two two terminal ethylenically-unsaturated groups selected from the group consisting of (meth)acryloyloxy groups, (meth)acryloylamino groups, vinyloxycarbonyloxy groups, vinyloxycarbonylamino groups; or (4) combinations thereof.

9. The method of claim 8, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxy-ethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxy-propyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxy-propyl]-terminated polydimethylsiloxane, α,ω-bis[(meth)acrylamidoethylamino-2-hydroxypropyloxy-propyl] terminated polydimethylsiloxane, α,ω-bis[3-(meth)acrylamido-propylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]terminated polydimethylsiloxane, α,ω-bis[(meth)acryloxyethylamino-carbonyloxy-(polyethylenoxy)propyl]terminated polydimethylsiloxane, or combinations thereof.

10. The method of claim 9, wherein said at least one thermal free radical initiator is an azo-containing radical initiator.

11. The method of claim 10, wherein the polymerizable composition comprises at least one UV-absorbing vinylic monomer and/or at least one UV/HEVL-Absorbing vinylic monomer.

12. The method of claim 11, wherein the polymerizable composition further comprise about 10% by weight or less of additional polymerizable components selected from the group consisting of one or more secondary hydrophilic vinylic monomers (i.e., hydrophilic vinylic monomers other than hydrophilic (meth)acrylamido monomer), one or more secondary siloxane-containing vinylic monomers (i.e., siloxane-containing vinylic monomers other than siloxane-containing acrylamido monomer), one or more hydrophobic vinylic monomers, one or more non-silicone vinylic crosslinkers, and combinations thereof, wherein said at least one secondary hydrophilic vinylic monomer comprises:

(1) a hydroxyl-containing (meth)acryloxy monomer selected from the group consisting of 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, and combinations thereof;

(2) a carboxyl-containing (meth)acryloxy monomer selected from the group consisting of (meth)acrylic acid, ethylacrylic acid, and combinations thereof;

(3) an amino-containing (meth)acryloxy monomer selected from the group consisting of 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof;

(4) an N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof;

(5) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof;

(6) a (meth)acryloxy monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, and combinations thereof;

(7) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof;

(8) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof;

(9) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloyl-amino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)ethylphosphate, 2-((meth)acryloyloxy)ethyl-2'-(triethylammonio)-ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)-propyl-2'-(trimethylammonio)ethylphosphate, 2-((meth)acryloyloxy)butyl-2'-(trimethylammonio)ethylphosphate, 2-((meth)acryloyloxy)pentyl-2-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylammonio)ethyl-2'-(trimethylammonio)ethylphosphate, 2-(allyloxycarbonyl-amino)ethyl-2'-(trimethylammonio)ethyl phosphate, 2-(butenoyloxy)ethyl-2'-(trimethylammonio)ethylphosphate, and combinations thereof;

(10) allyl alcohol;

(11) N-2-hydroxyethyl vinyl carbamate;

(12) N-vinyloxycarbonyl-β-alanine (VINAL);

(13) N-vinyloxycarbonyl-α-alanine; or

(14) combinations thereof, wherein said at least one secondary siloxane-containing vinylic monomer comprises at least one siloxane-containing vinylic monomer of formula (M1) or (M2):

(M1)

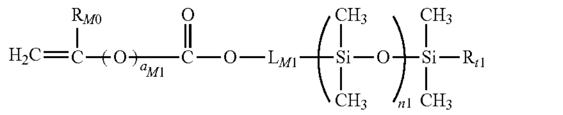

(M2)

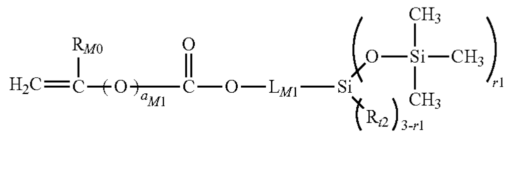

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $$-L_{M1}'-X_{M1}-L_{M1}''-,\quad -(C_2H_4O)_{v1}-CONH-L_{M1}''-,$$

$$-(C_2H_4O)_{v1}-L_{M1}''-,\quad -L_{M1}'-NHCOO-(C_2H_4O)_{v1}-L_{M1}''-,$$

$$-CH_2-CH(OH)-CH_2-X_{M1}'-(C_2H_4O)_{v2}-L_{M1}''-,$$

$$-L_{M1}'-X_{M1}'-CH_2-CH(OH)-CH_2-O-L_{M1}''-,\quad \text{or}$$

$$-(C_2H_4O)_{v1}-CH_2-CH(OH)-CH_2-O-L_{M1}''-;$$

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{12}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

13. The polymerizable composition of claim 12, wherein the polymerizable composition further comprise at least one secondary siloxane-containing vinylic monomer which comprises tris(trimethylsilyloxy)silylpropyl (meth)acrylate, [3-(meth)acryloxy-2-hydroxypropyloxy]-propylbis(trimethylsiloxy)methylsilane, [3-(meth)acryloxy-2-hydroxypropyloxy]-propylbis(trimethylsiloxy)butylsilane, 3-(meth)acryloxy-2-(2-hydroxyethoxy)-propyloxy)propylbis (trimethylsiloxy)methylsilane, 3-(meth)acryloxy-2-hydroxypropyloxy)propyltris(trimethyl-siloxy)silane, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethylsiloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof, wherein the polymerizable composition further comprise at least one non-silicone vinylic crosslinking agent selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, 3,4-bis[(meth)acryloyl] tetrahydrofuran, diacrylamide, dimethacrylamide, N,N-di(meth)acryloyl-N-methylamine, N,N-di(meth) acryloyl-N-ethylamine, N,N'-methylene bis(meth) acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth) acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, allylmethacrylate, allylacrylate, N-allyl-(meth)acrylamide, and combinations thereof.

14. The method of claim 13, wherein the polymerizable composition is degassed to minimize the concentration of $O_2$ in the polymerizable composition.

15. The method of claim 14, wherein the step of curing thermally in the oven is carried out under $N_2$ or Ar atmosphere, wherein the $N_2$ or Ar environment in the oven is maintained by flowing $N_2$ or Ar through the oven at a flow rate.

* * * * *